United States Patent [19]

Czernakowski et al.

[11] 4,159,127
[45] Jun. 26, 1979

[54] SAFETY APPARATUS FOR RESTRAINING A SEATED OCCUPANT IN A VEHICLE

[75] Inventors: Waldemar Czernakowski, Blaustein; Hermann Wetter, Ulm; Ludwig Berger, Ulm-Donaustetten, all of Fed. Rep. of Germany

[73] Assignee: Romer-Wingard Autogurte GmbH, Fed. Rep. of Germany

[21] Appl. No.: 890,777

[22] Filed: Mar. 27, 1978

Related U.S. Application Data

[63] Continuation-in-part of Ser. No. 742,495, Nov. 17, 1976, abandoned.

[30] Foreign Application Priority Data

Nov. 19, 1975 [DE] Fed. Rep. of Germany ....... 2551843
Dec. 17, 1977 [DE] Fed. Rep. of Germany ....... 2756401

[51] Int. Cl.$^2$ .............................................. B60R 21/10
[52] U.S. Cl. ..................................... 280/751; 280/753; 297/464
[58] Field of Search ........................ 280/748, 751, 753; 297/390, 216, 384

[56] References Cited

U.S. PATENT DOCUMENTS 3,424,497 1/1969 Brilmyer .............................. 297/390
3,975,037 8/1976 Hontschick .......................... 280/733

Primary Examiner—Robert R. Song
Attorney, Agent, or Firm—Steele, Gould & Fried

[57] ABSTRACT

Safety apparatus for restraining a seated occupant in a vehicle may comprise a tunnel-shaped body to restrain the lower torso of a large child or an adult, the body providing a base on which a movable chest-restraining panel is pivotally mounted. In the case of a small child, the lower torso restraining means includes an additional seat providing a base, for example, with a separate fixed panel and/or side portions, on which the chest restraining panel is pivotally mounted. The straps at each side of the occupant's body anchor the lower torso restraining means to the vehicle while enabling limited inertial movement relative to the vehicle seat. If the vehicle decelerates suddenly, the occupant's inertia moves the lower torso restraining means away from the seat until the straps are tensioned and act on lever means to pivot the chest restraining panel into its operative position. Either the lever means, or other locking means, may act as a stop to prevent return movement of the chest restraining panel. The locking means may comprise a pair of pivoted arms which lock on unfolding, or a pivoted arm passing over a linear ratchet, or a circular cut out made of soft material engaged by a pawl.

15 Claims, 20 Drawing Figures

SAFETY APPARATUS FOR RESTRAINING A SEATED OCCUPANT IN A VEHICLE

CROSS REFERENCES TO RELATED APPLICATIONS

The subject application is a continuation-in-part of U.S. patent application Ser. No. 742,495 filed Nov. 17, 1976, now abandoned.

FIELD OF INVENTION

The invention relates to a safety apparatus for restraining a seated occupant in a vehicle. More particularly the safety apparatus of the present invention includes lower torso restraint means, normally positioned about the lower torso of the occupant, and upper chest restraint means which is moved from a stored position to a restraint position in front of the occupant's chest due to vehicle deceleration.

DESCRIPTION OF PRIOR ART

German Utility Models Nos. 7,332,467 and 7,339,423 describe apparatus for safeguarding children, the apparatus generally including a restraining member made from rigid plastics foam or some other material which is lastingly deformable to consume energy, and a belt for securing the restraining member and which extends rearwardly on both sides for attachment to suitable points on the vehicle. The restraining member is supported either by a bottom part resting on the vehicle seat and having cut-outs for the child's legs, or directly on the arms of a special child safety seat placed on the conventional vehicle seat. On its upper face, the restraining member is constructed, as it were, like a table with a substantially flat surface, so that it can be used as a support for a toy, as a playing area or the like. On its edge which is towards the child, the restraining member has a cut-out adapted more or less to the shape of the child's body. The height and width of the restraining member, the size and pattern of this cut-out and its convex rounded edge at top and bottom are so dimensioned that the restraining force exerted by the restraining member is distributed over the pelvis and chest cavity of the child. Therefore, the upper part of the child's body can bend forwards so that in the event of an accident, an overloading of the neck is prevented, and the head cannot whip forwards towards the footwear, because it is restrained by the restraining member.

Such restraining systems have in practice proved suitable in safeguarding children, since they exclude any overloading of the cervical portion of the spine, such as may be feared where a child is safeguarded by belts, particularly if the upper part of the child's body is held back, for example, by a shoulder harness type of belt. However, by reason of the possibility of the child's head and upper body shifting forwards in the event of an accident, the securing principle whereby the neck is relieved, finds its limit wherever an excessive forwards shift results in the subject striking the front seat. The degree of forwards shift in the case of the known retention systems which have a restraining member can, however, only be influenced to a very limited extent, namely by increasing the thickness of the restraining member so that its restraining effect is greater with respect to the chest of the person secured. Restraining members which extend to the chest area, such as described in U.S. Pat. No. 3,424,497, considerably restrict the child and are so uncomfortable that they are not viable in practice.

U.S. Pat. No. 3,975,037 describes a child safety device in which a deformable airbag is attached, by means of loops, to a retaining belt. In the event of rapid vehicle deceleration, the child moves forwardly of the vehicle seat so as to compress and thereby deform the airbag whereby the airbag is raised in front of the child's body. However, the upright deformed position of the airbag (shown in FIG. 2 of this prior art specification) may not be maintained under load. In this case, the airbag will deform even more and allow the body to travel further in the forwards direction without properly restraining its forward motion. In other words, the body can bend forwardly from the waist with the chest bearing downwardly on the deformed airbag and hence the child's head may strike the front seat of a vehicle in which the airbag device is fitted at the rear.

The problems described above are worse in the case of adults, by reason of the size of the adult's body and the forwards shift which results therefrom. This is why safety apparatus with a form of chest panel have not hitherto found ready applications in the case of adults where the relative height of the restraining member at the chest is even more important.

An object of the invention is to solve the above-mentioned problems by providing a safety apparatus in which a restraining member is positioned so as to prevent excessive forward displacement of a seated occupant, without the occupant losing any comfort or being adversely affected.

SUMMARY OF INVENTION

The present invention provides safety apparatus for restraining a seated occupant in a vehicle, the apparatus comprising lower torso restraining means defining a space to receive the thighs of said occupant. This may take the form of a tunnel shaped body, especially in the case of a large child or an adult, which fits over the thighs of the occupant and provides a base on which a movable chest restraining panel is pivotally mounted. Alternatively, and especially in the case of a small child, the lower torso restraining means may include an additional seat for the occupant, which additional seat rests on the vehicle seat and provides a base (for example, by being provided with a separate fixed panel and/or side portions which extend, at each side, along the occupant's thighs) on which the chest restraining panel is pivotally mounted. However, in general, the lower torso restraining means comprises panel means pivotally supported thereon and capable of pivotal movement from a stored position into an operative position before the chest of the occupant. Lever means are provided and arranged to pivot about a point on said restraining means adjacent the lower torso of said occupant. Strap means are provided at each side of the occupant's body for anchoring the lower torso restraining means to the vehicle whilst enabling limited inertial movement relative to the vehicle seat. Such movement occurs if the vehicle decelerates suddenly whereby the occupant moves forwardly due to inertia thereby moving the lower torso restraining means away from the seat to the extent permitted by the lengths of the straps. The straps are then tensioned and act on the lever means to pivot said panel means into its operative position where it is prevented from moving back into its stored position on the lower torso restraining means. Either the lever means, as a result of the tension in said strap means, or other independent means may act as a stop to prevent such return movement of said panel means.

By reason of the movement of said panel means to its operative position, the occupant is entirely restrained with the main restraining forces being shifted out of the stomach area and into the chest area. Furthermore, by reason of the amount of travel by which said panel means moves upwardly into its operative position, it is possible to predetermine the extent by which the occupant's upper torso can at most bend forward, in the event of an accident, before being held back by the chest panel which is moving towards him. As a result, an excessive forward shift of the upper torso can be prevented in an accident. Only when impact deceleration commences, is the pivotable chest panel moved out of its lower or storage position, where it extends across the lower torso restraining means in the manner of a table, to its upper or operative position where it is particularly effective in restraining the occupant. Thus, the chest panel does not normally obstruct the occupant's movement in its stored position, but moves rapidly into its operative position in the event of a collision. Under the action of the forces transmitted by the strap means in a collision, this occurs so rapidly that upward movement of said panel means takes place before the forward bending movement of the upper torso of the occupant. A safety apparatus according to the invention can therefore be used to secure adults as well as children. Compared with conventional belt systems, the larger area of said panel means gives a more favourable force distribution in restraining the occupant.

The lever means which causes said panel means to pivot into its operative position may include a member positioned between said lower torso restraining means and said panel means so as to pivot about an edge nearest the lower torso of the occupant. Suitably, such a member includes a guide at each side over which respective straps are entrained, each strap having one end fixed to the floor of the vehicle and its other end fixed to the respective point on said lever means remote from its pivot. In such an embodiment, following vehicle deceleration, the tension in said strap means causes said lever means both to pivot and hence raise said panel means into its operative position, and to maintain said lever means in its pivoted position to act as a stop to prevent return movement of said panel means to its stored position. However, circumstances may arise in which said panel means may be caused to move from its operative position towards its lower or stored position. Such circumstances could occur when there are momentary jerky variations in the tension or restraining force of said strap means, the cause of which may be due to fittings on said strap means. Heavy jerky variations in such restraining forces may also occur, for example, in pile-ups where the vehicle undergoes, in the course of time, widely varying accelerational and decelerational forces. Brief intermittent variations of the restraining forces may, in addition, be the consequence of the springy behaviour of the vehicle seats. Thus, in these circumstances, the chest restraint may be momentarily impaired by brief variations in the restraining forces. This problem, however, is overcome in the present invention by providing locking means for locking said panel means in its operative position so that it cannot return to its stored position despite any variations in the tension in said strap means.

More particularly, said locking means may be embodied in the form of a pair of pivoted arms, preferably provided on each side of said panel means, which may be folded together in the stored position but which are locked in an unfolded position to secure said panel means in its operative position. Alternatively, said locking means may comprise ratchet means, preferably provided on each side of said panel means, engaged by a member which slides over the ratchet as said panel means is pivoted into its operative position but which is prevented, by the ratchet, from reverse movement. The ratchet means may include teeth which extend linearly on one or both sides of said lower torso restraining means. Alternatively, said locking means may be embodied in the form of a plate having a circular cut out centered on the pivoting axis of said panel means, the circular cut out being arranged to enclose a spring loaded pawl which prevents return movement of said panel means after reaching its operative position. In such embodiments, said lever means is fixed to said panel means adjacent its pivoting axis and said strap means is attached to a point on said lever means remote from said axis. Such lever means may be shorter than in the former case where the lever means acts as a stop depending on the tension applied to said strap means. The purpose of such lever means is only to cause said panel means to be pivoted into its operative position before the chest of the occupant where said locking means prevents any return movement.

Thus, the latter mentioned locking means solves the problem of avoiding any return movement of said panel means during intermittent brief changes in tension in said strap means during an accident where the occupant is subjected to various forces and displacements.

The invention will become more apparent with regard to the following description of exemplary embodiments.

DESCRIPTION OF PREFERRED EMBODIMENTS

Figure 1A:
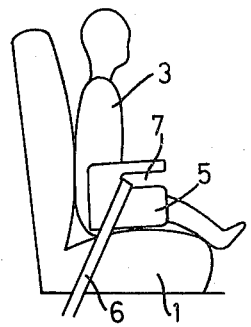
FIGS. 1a–1d illustrate a known restraining apparatus and shows successive phases in the pattern of movement of an occupant restrained thereby.
Figure 1B:
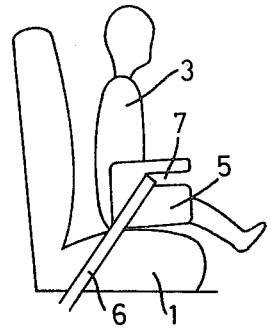

Referring to FIGS. 1-5, a seat 1 is rigidly connected to the body (where shown) of a vehicle. An occupant 3, who may be a child or an adult, occupies the seat 1. The safety apparatus for restraining the occupant is denoted generally by reference numeral 5.

Referring to FIGS. 2 and 5, the safety apparatus according to the invention comprises lower torso restraining means in the form of a tunnel shaped body 5b which supports a pivotable chest panel 5a. The tunnel shaped body 5b may rest on the seat 1 or be supported by the thighs of the occupant. In no case, is the tunnel shaped body 5b rigidly connected to the vehicle seat.

Referring to the embodiment of the invention shown in FIG. 4, the occupant is a child and the safety apparatus comprises an additional seat 4 which is freely supported on the vehicle seat 1. In this case, the chest panel 5a is supported on a fixed panel 5b rests on arms 4a or on the thighs of the occupant.

Referring to FIGS. 6-8 which show further embodiments of the invention employing locking means to secure the chest panel in its operative position, only the lower torso restraining means 5b and the pivoting chest panel 5a have been shown for clarity. It will be understood, however, that the lower torso restraining means 5b is of a tunnel shape similar to that used in the embodiments of FIGS. 2 and 5.

Referring more particularly to FIG. 1, the known form of safety apparatus 5 comprises a generally tunnel shaped body secured to seat 1 by a belt 6 extending through a groove 7. The belt 6 extends on both sides of the body towards attachment points on the body of the vehicle (not shown).

Figure 1C:
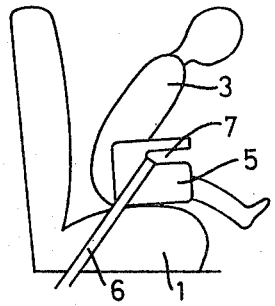
Figure 1D:
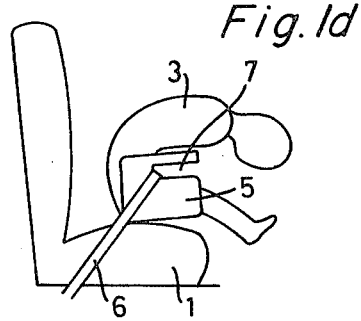

FIG. 1a shows the normal situation when the occupant is not subjected to any decelerational forces. However, in the case of an accident, when such forces act on the occupant, the inertia of the occupants body moves the body of the apparatus 5 forwardly on seat 1 until the belt 6 is taut (FIG. 1b), whereupon the lower torso is secured but the upper torso bends forward increasingly as shown in FIGS. 1c and 1d. Such movement may lead to injury.

Figure 2A:
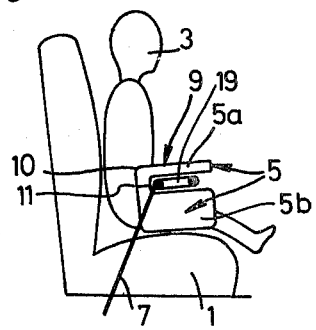
FIGS. 2a–2d schematically illustrate safety apparatus in accordance with one embodiment of the invention and show successive phases in the pattern of movement of an occupant restrained thereby.
Figure 2B:
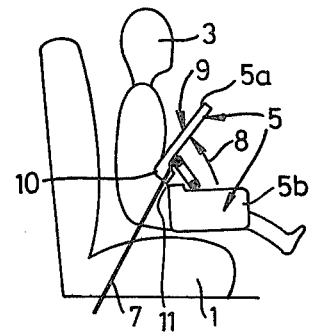
Figure 2C:
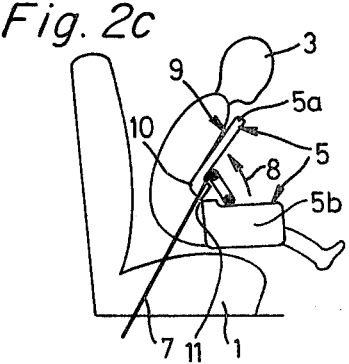
Figure 2D:
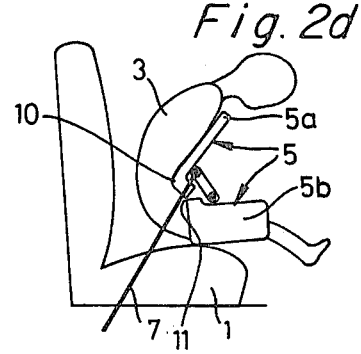
Figure 3A:
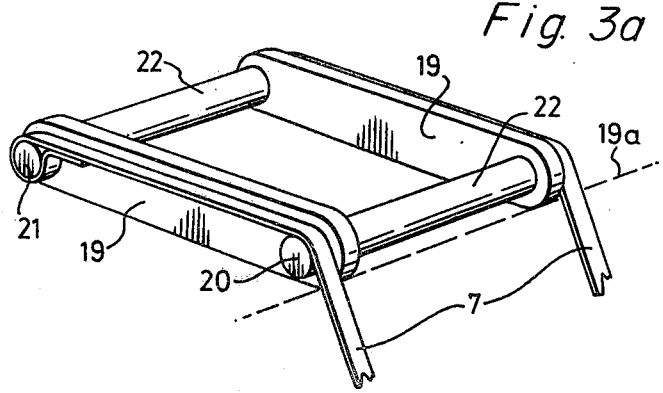
FIG. 3 illustrates one type of lever means used in the embodiments shown in FIGS. 2, 4 and 5.
Figure 3B:
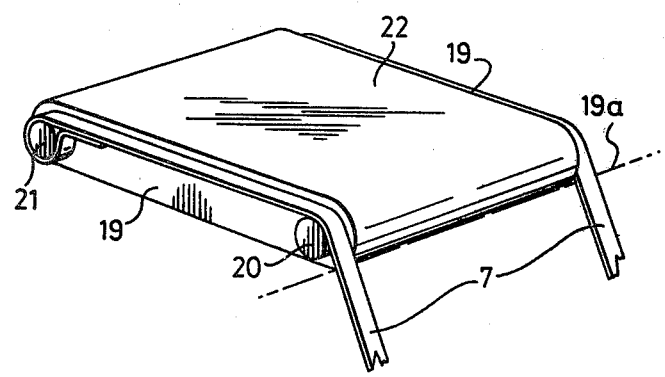

FIGS. 2a-2d show one embodiment of the invention in similar phases of operation. However, in this case, a safety apparatus 5 comprises lower torso restraining means in the form of a tunnel shaped body 5b on which a chest panel 5a is supported for pivotal movement in the direction of arrow 8. The panel 5a extends substantially horizontally, in a table-like fashion, in a normal or stored position as shown in FIG. 2a. Its pivotal movement is caused by the action of lever means 19 which is located between the panel 5a and the body 5b. The lever means is shown in more detail in FIG. 3 and comprises a member or members 22 which extend across body 5b and pivot about an edge 19a nearest the occupant. On each respective side of the seat 1, a strap or belt 7 passes over a guide 21 on the inner end of lever 19, nearest the occupant, and is attached to a connection member 21 at the outer end, remote from the pivoting edge 19a of the lever means 19. The rearward edge 10 of panel 5a is provided with a cut-out shaped to fit the body of the occupant. The width of panel 5a, the size and pattern of the cut-out and its convex rounding upwardly and downwardly are such as to distribute the restraining forces acting on the occupant over the pelvis, stomach and lower rib cage to avoid inadmissibly high loadings in the stomach zone. The edge 10 enables the forward shift of the occupants body shown in FIGS. 2b-2d, when the decelerational forces act in an accident condition. In this case, the panel 5a pivots upwardly about an axis of rotation 11, which is remote from edge 10, towards the occupant's chest as belts 7 become taut (FIG. 2b). Panel 5a is maintained in this position, by the belt tension acting on lever means 19, and acts as a stop to prevent return movement of panel 5a. Thus, the upper torso of the occupant is restrained before the occupant starts to bend forward as shown in FIGS. 1a-1d.

The width of panel 5a substantially corresponds with the width of the occupants body and the depth corresponds substantially to the length of the occupants body between the pelvis and upper chest. Therefore, when the panel 5a is pivoted into its upward position, it extends from the thighs of the occupant to the upper part of the chest to form a large area of support to restrain the upper torso.

Figure 4A:
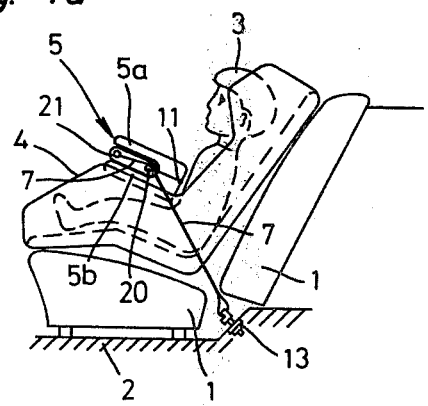
FIGS. 4a and 4b schematically illustrate successive phases of movement of safety apparatus in accordance with a further embodiment of the invention and including an additional seat for use with a smaller child.
Figure 4B:
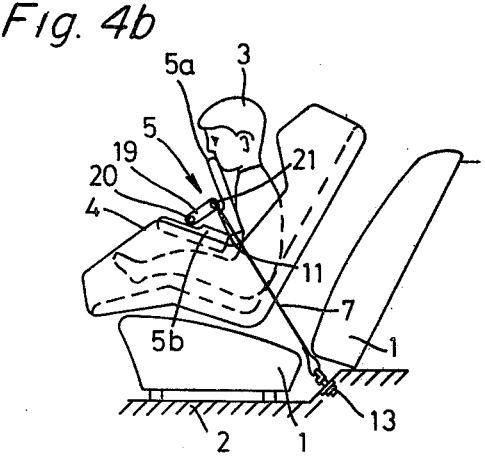

FIGS. 4a and 4b show the rest and final positions of another embodiment in which a child 3 occupies the additional seat 4. In the illustrated embodiment, the chest panel 5a is pivotally supported on a fixed member or panel 5b. Panels 5a, 5b may form a unit which is placed over the child's thighs or which is supported by the arms 4a of seat 4. However, the chest panel 5b may also be pivoted on the arms 4a of seat 4. As in the embodiment of FIGS. 2a-2d, the panel 5a is pivoted into an oblique position before the occupant's chest (FIG. 6b) by lever means 19 attached to a belt 7 on each side of the seat 4. Each belt 7 passes over a guide 20 on lever 19 and is attached to a connection member 21. The operation of this embodiment will be apparent from the description of FIGS. 2a-2d.

Figure 5A:
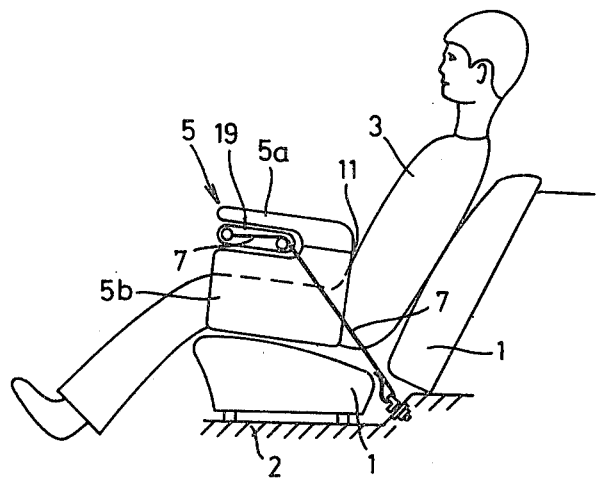
FIG. 5 schematically illustrates the phases of movement of an embodiment similar to that of FIG. 2 but used by a larger child or adult.
Figure 5B:
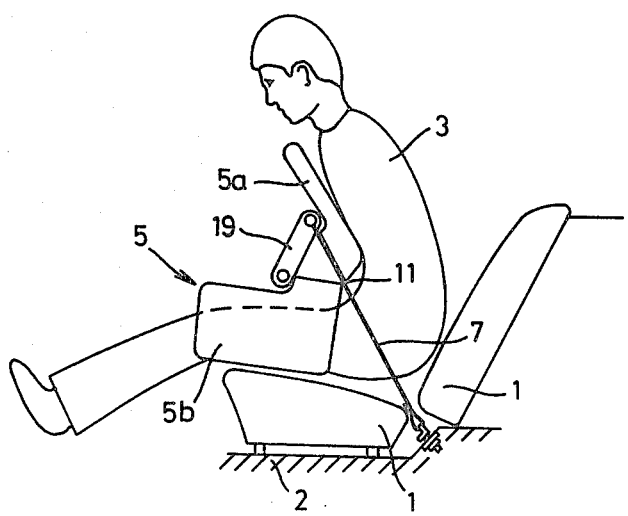

FIGS. 5a and 5b show the rest and final positions of a further embodiment in which the thighs of an adult 3 are restrained by a tunnel shaped body 5b and the chest is restrained by a panel 5a mounted for pivotal movement on body 5b (FIG. 5b). As the construction and operation of this embodiment is similar to that of the embodiment described with reference to FIGS. 2a to 2d, no further description is necessary.

In general, the tension in the belts 7 may be transmitted to the chest panel 5a by single armed or twin armed levers, or by an eccentric member or members. Lever means 19, as in some of the foregoing embodiments, is an example of such transmission means and it is arranged so that the tension in the respective belt acts over the guide 20 adjacent the pivoting axis of chest panel 5a so as to rotate the connecting member 21 towards the occupants chest. This causes pivotal movement of the panel 5a into its upwardly inclined position.

Figure 6A:
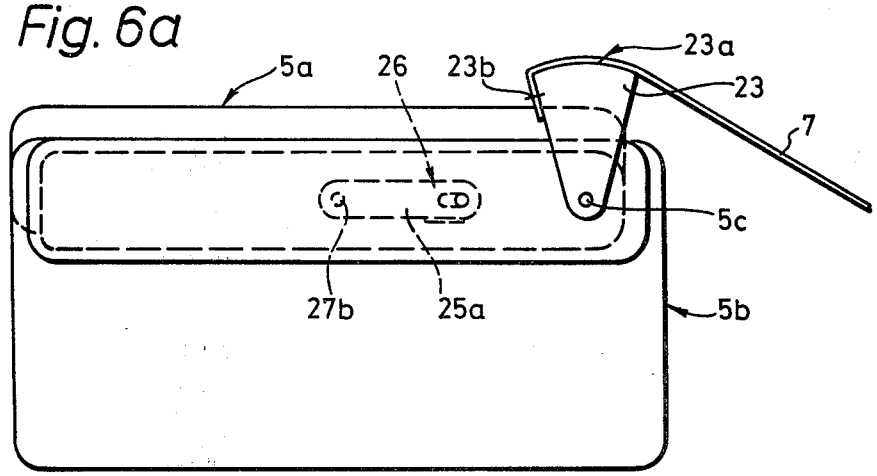
FIGS. 6a and 6b show a side view, of the respective phases of movement, of another embodiment of the present invention which employs locking means to secure the raised position of a chest panel.
Figure 6C:
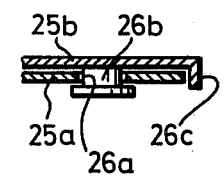
FIG. 6c is a section, on the lines cc, through a lever arrangement shown in FIG. 6b, FIGS. 7a and 7b show the phases of movement of another embodiment employing locking means.
Figure 6B:
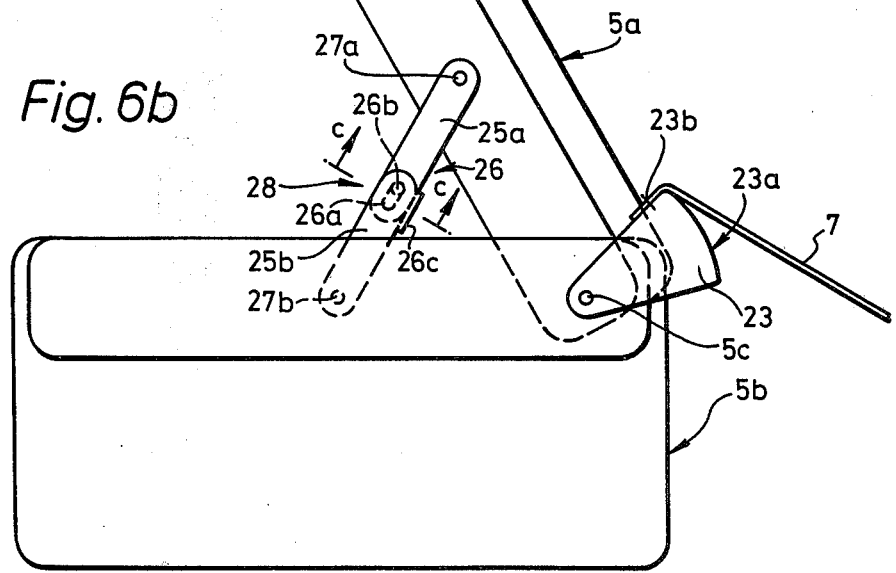

Referring to FIGS. 6a-6c, a chest panel 5a is pivotally mounted, by a pivot pin 5c relative to torso restraining means 5b which has a tunnel shaped body as described above. A segmental shaped lever 23 is fixed at each side of the chest panel 5a. Each lever 23 has an arcuate surface 23a over which a respective restraining strap or belt 7 is guided, one end of the belt being fixed to a part 23b of the lever and the other end (not shown) being anchored to the vehicle. A releasable safety belt buckle may be inserted at a suitable point in the belt 7, although this is not illustrated. Whilst the illustrated embodiment employs a tunnel shaped body 5b, the concept described with respect to any of the embodiments shown in FIGS. 6, 7 or 8 may be applied to an additional child's seat (see FIG. 4) supported by the vehicle seat (not shown). If tension is applied to belts 7, the chest panel 5a pivots upwardly about pin 5c from its storage position (FIG. 6a) to its operative position (FIG. 6b) in which it is inclined away from the occupant's chest but where it prevents excessive forward bending of the occupant and thereby restrains the upper torso of the occupant.

Locking means 28 are provided to secure the chest panel 5a in its operative position. The locking means 28 comprises two arms 25a, 25b which are joined by a pivot pin 26b, one arm 25a being pivotally connected at 27a to the chest panel 5a and the other arm 25b being pivotally connected at 27b to the tunnel shaped body 5b. Pin 26b is fixed to arm 25b and is guided slidably in a slot 26a in the lever 25a. In the region of the folding joint 26, the lever 25a carries a lateral stop 26c. The distance between this stop 26c and the pivot pin 26b, together with the length of the slot 26a, are so adjusted, relative to one another, that mutual rotation of the arms 25a or 25b about the pivot pin 26b is possible when the arms unfold as the chest panel 5a is moved upwardly due to the tension in belts 7. However, when the chest panel 5a reaches its operative position (FIG. 6b) the slot 26a moves down with respect to pin 26b, thereby shortening the effective overall length of the aligned arms 25a, 25b and lower end of lever 25a is locked against the stop 26c. Thus, return movement of the chest panel 5a, towards its storage position, is prevented even if the tensile forces in belts 7 momentarily deline or are completely absent. The chest panel 5a can be subsequently returned, however, by pivoting the panel 5a towards the occupant to move slot 26a upwardly with respect to pin 26b, and by pushing the joint 6 forwardly to cause the arms 25a, 25b to fold.

Figure 7A:
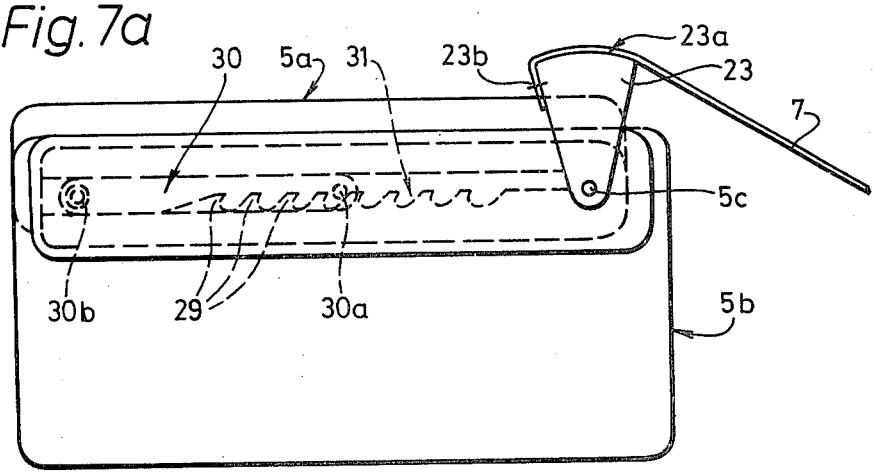
Figure 7B:
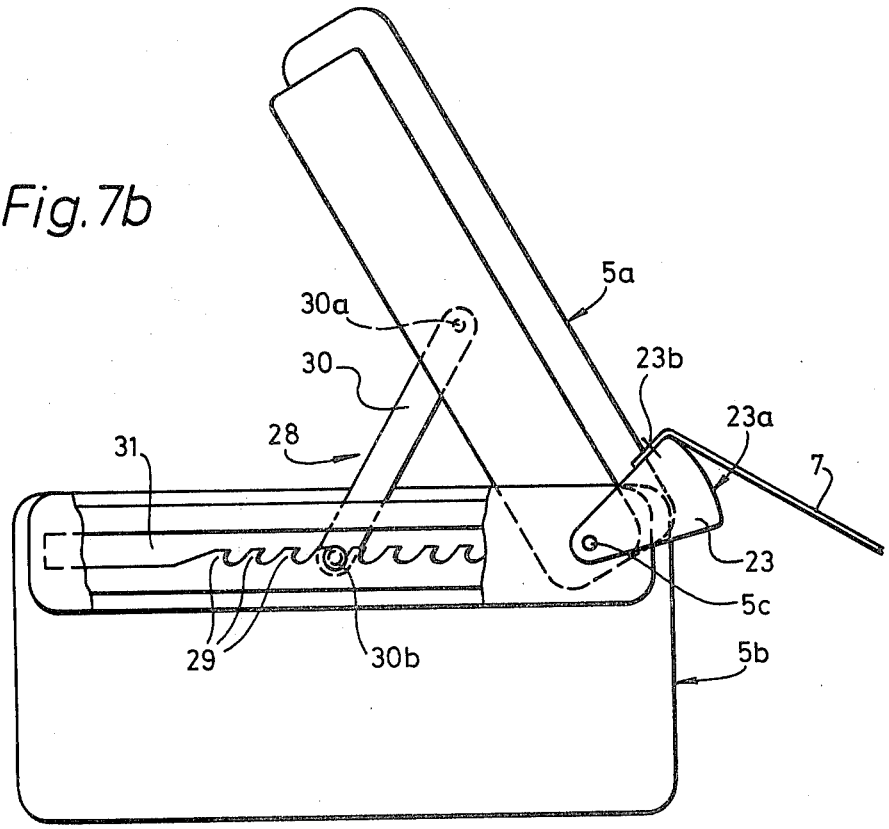

The embodiment shown in FIGS. 7a and 7b uses a different locking means 28 in that the folding arms are replaced by a linear ratchet (having teeth 29) fixed to the tunnel shaped body 5b together with a lever-shaped pawl 30 pivotally connected at 30a to the chest panel 5a. Such a ratchet and pawl mechanism is fitted at each side of the tunnel shaped body 5b. The lever pawl 30 has a pin 30b at one end which is guided by slot 31, so as to ride over teeth 29, in the direction towards the occupant, when tension is applied to belts 7 to raise the chest panel from its storage position (FIG. 7a) into its operative position (FIG. 7b). The ratchet teeth 29 prevent movement in the opposite direction, thus preventing return movement of the chest panel 5a from the inclined position it has reached due to the tension in belts 7. If this is a position lower than its maximum upright position, the chest panel 5a will be raised further when more tension is applied to belts 7. The panel 5a may be returned by pivoting the panel 5a towards the occupant and by releasing pin 30b from the ratchet teeth 29 and holding the pin above the teeth as the panel 5a is lowered.

Figure 8A:
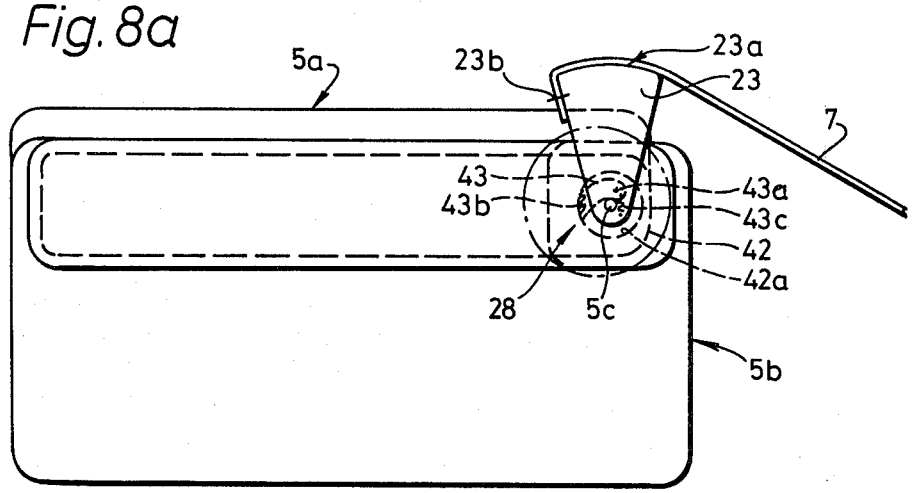
FIGS. 8a and 8b show the phases of movement of a further embodiment employing locking means.
Figures 8B, 8C:
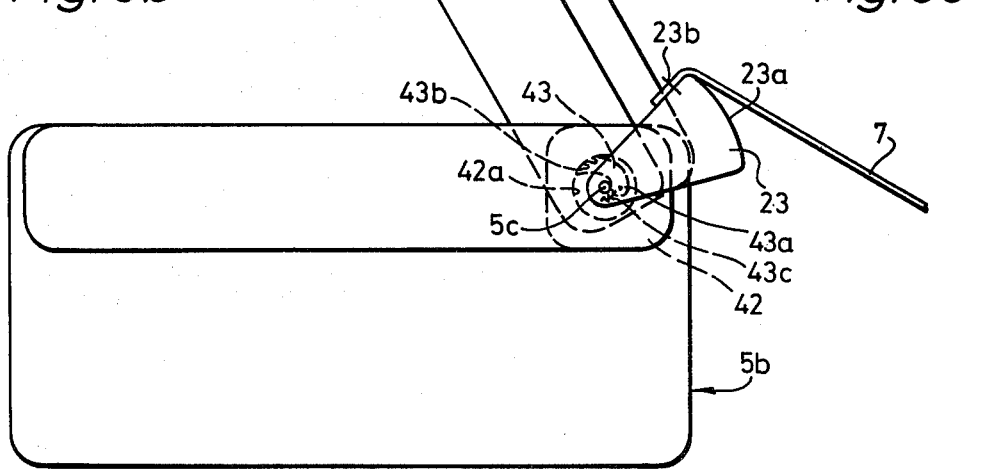
FIG. 8c shows a detail of a circular type locking means used in the embodiments of FIGS. 8a–8b.

In the embodiment of FIGS. 8a–8c, the locking means 28 is installed directly adjacent one end of the lever. Such locking means 28 is fitted at each side of the tunnel-shaped body 5b and comprises a plate 42 fastened to body 5b. The plate has a circular cut out 42a coaxial with pin 5c. Eccentrically, in relation to pin 5c, the segmental lever 23 carries a pawl 42 which is rotatable at 43a and whose locking teeth 43b bear against the edge of the circular cut out 42a (in the manner of a ratchet) under the force of a spring 43c. The plate 42, or at least the edge of the circular cut out 42a, is made of softer material than the pawl 43 so that the teeth 43b, which are directed away from the direction of rotation, will dig into the cut out 42a to prevent anticlockwise (as illustrated) rotation of the panel 5a. Thus, clockwise rotation (as illustrated) of panel 5a is possible to allow it to pivot from its stored position (FIG. 8a) into its operative position (FIG. 8b) but anticlockwise rotation is prevented. In other words, when tension is applied to belts 7, the panel 5a pivots into its operative position and return movement is prevented by the locking means 28. The respective pawls 43 may be provided with actuators (not shown) in the form of bosses, pins or the like by means of which each respective pawl can be urged, by hand, away from the circular edge of the cut out 42a, against the force of the spring 43c, in order to enable the chest panel 5a to be intentionally returned to its storage position. The circular cut out may alternatively be provided with a ring of teeth to cooperate with the pawl 43.

The above described embodiments are examples of the invention and other arrangements or modifications may be constructed without departing from the scope of the invention which is defined by the following claims:

What is claimed is:

1. Safety apparatus for restraining an occupant in a vehicle seat, the apparatus comprising lower torso restraining means defining a space to receive the thighs of said occupant, said lower torso restraining means including panel means pivotally mounted thereon, said panel means being capable of pivotal movement from a stored position on said lower torso restraining means into an operative position before the chest of said occupant; lever means arranged to pivot about an axis on said restraining means adjacent the lower torso of said occupant; and a strap at each side of said lower torso restraining means for anchoring said lower torso restraining means to the vehicle whilst enabling limited inertial movement of said lower torso restraining means, relative to said vehicle seat, due to vehicle deceleration; each of said straps being attached to a respective point on said lever means remote from its pivoting axis whereby inertial movement of said occupant, relative to said vehicle seat, causes said lower torso restraining means to move away from said vehicle seat so that tension is applied to each of said straps to cause said lever means to pivot said panel means into its operative position before the chest of said occupant where it is prevented from moving back towards its stored position.

2. Apparatus according to claim 1 wherein said lower torso restraining means is in the form of an additional seat for a child occupant, said seat being provided to rest on the vehicle seat and including a fixed base panel which is intended to extend across the thighs of the child occupant when seated on said additional seat, said panel means being in the form of a movable panel pivotally connected to said base panel.

3. Safety apparatus according to claim 1 wherein said lower torso restraining means comprises a tunnel shaped body to fit over the thighs of said occupant on said vehicle seat, said panel means being a panel supported for pivotal movement on said body.

4. Apparatus according to claim 1 wherein said lever means comprises a guide at each respective side of said lower torso restraining means adjacent the lower torso of said occupant, each of said straps passing over the respective guide before being attached to the respective point remote from the pivoting axis of said lever means.

5. Safety apparatus for restraining an occupant in a vehicle seat, the apparatus comprising lower torso restraining means defining a space to receive the thighs of said occupant, said lower torso restraining means including panel means pivotally mounted thereon, said panel means being capable of pivotal movement from a stored position on said lower torso restraining means into an operative position before the chest of said occupant; lever means arranged to pivot about an axis on said restraining means adjacent the lower torso of said occupant, said lever means including a member which extends transversely between said restraining means and said panel means, said member being provided with a guide at each side of said restraining means; and a strap at each side of said restraining means, one end of each strap being provided to be anchored to said vehicle and the other end passing over said guide and being attached to a respective point on said member remote from its pivoting axis, said straps enabling limited inertial movement of said restraining means, relative to said vehicle seat, due to vehicle deceleration, whereby tension in each of said straps causes said member to pivot about said pivoting axis to cause said panel means to be moved from its stored position into its operative position wherein said member acts as a stop, due to the tension in said straps, to prevent return movement of said panel means towards its stored position.

6. Apparatus according to claim 5 wherein said lower torso restraining means comprises an additional seat for a child occupant, said seat being provided to rest on the vehicle seat and providing a fixed base on which said panel means is pivotally mounted.

7. Safety apparatus according to claim 1 wherein said lower torso restraining means comprises a tunnel shaped body to fit over the thighs of said occupant on said vehicle seat, said panel means being a panel supported for pivotal movement on said body.

8. Safety apparatus for restraining an occupant in a vehicle seat, the apparatus comprising lower torso restraining means defining a space to receive the thighs of said occupant, said lower torso restraining means including panel means pivotally mounted thereon, said panel means being capable of pivotal movement from a stored position on said lower torso restraining means into an operative position before the chest of said occupant; lever means fixed to said panel means and arranged to pivot therewith about an axis on said restraining means adjacent the lower torso of said occupant; a strap at each side of said lower torso restraining means, each strap having one end intended to be anchored to said vehicle and its other end attached to a respective point on said lever means remote from its pivoting axis; and locking means coupled between said lower torso restraining means and said panel means, said locking means enabling said panel means to be pivotally moved into its operative position but preventing return movement therefrom towards its stored position; whereby inertial movement of said occupant, relative to said vehicle seat, causes said lower torso restraining means to move away from said vehicle seat so that tension is applied to each of said straps to cause said lever means to pivot said panel means into its operative position where it is prevented, by said locking means from moving back towards its stored position.

9. Safety apparatus according to claim 8 wherein said locking means comprises two pairs of pivoted arms, each pair of arms being mutually pivoted together, the remote ends of the arms being connected respectively to said restraining means and to said panel means, said mutual pivot comprising a slidable connection and a stop whereby the arms, when unfolded to align the axis of slidable movement, can slide relatively into a locking position to prevent said return movement of said panel means.

10. Safety apparatus according to claim 8 wherein said locking means comprises a ratchet and pawl device coupled between said restraining means and said panel means to enable movement of said panel means into its operative position but to prevent said return movement.

11. Safety apparatus according to claim 10 comprising a ratchet and pawl at each side of said panel means, said ratchet comprising a member defining a slot having a row of ratchet teeth along one edge, said member being fixed to said restraining means and said pawl comprising a lever pivotally mounted at one end on said panel means and having engagement means at its other end for the teeth on the ratchet.

12. Safety apparatus according to claim 8 wherein said locking means comprises a member fixed to said restraining means and defining a circuit cut out, and a pawl coupled to said panel means for engaging said cut out whereby said panel means is free to pivot into its operative position but return movement towards said stored position is prevented by engagement between said pawl and said cut out.

13. Safety apparatus according to claim 12 including spring biasing means for biasing said pawl towards said cut out.

14. Safety apparatus according to claim 13 wherein said pawl and said spring biasing means are supported by said lever means and wherein said member is a plate having said circular cut out, said plate being fixed to said restraining means and being made of softer material than said pawl whereby said pawl digs into the edges of said cut out to prevent said return movement.

15. Safety apparatus according to claim 8 wherein said lever means comprises a segmental shaped lever fixed, one at each side, to said panel means; the respective strap passing over an arcuate portion of the associated segmental lever and being attached to a point remote from the lever pivot.

* * * * *